United States Patent [19]

Hueckler et al.

[11] Patent Number: 4,821,834

[45] Date of Patent: Apr. 18, 1989

[54] MOUNTING OF A STEERABLE WHEEL

[75] Inventors: Volker Hueckler, Radolfzell; Ulrich Eckhardt, Altrip, both of Fed. Rep. of Germany

[73] Assignee: Deere & Company, Moline, Ill.

[21] Appl. No.: 125,311

[22] Filed: Nov. 25, 1987

[30] Foreign Application Priority Data

Nov. 29, 1986 [DE] Fed. Rep. of Germany ....... 3640931

[51] Int. Cl.⁴ ............................................. B60K 17/30
[52] U.S. Cl. .................................... 180/255; 280/661; 280/675
[58] Field of Search ............... 180/255, 256, 266, 265, 180/253, 252, 10; 280/675, 673, 93, 661

[56] References Cited

U.S. PATENT DOCUMENTS 4,482,025  11/1984  Ehrlinger et al. ................. 180/255

FOREIGN PATENT DOCUMENTS 1118034  6/1968  United Kingdom ............... 280/673

Primary Examiner—John A. Pekar

[57] ABSTRACT

A mounting of a steerable wheel, in particular a driven wheel, which is carried on a front axle of an agricultural tractor, has a pivot axis which is displaced horizontally rearwardly with respect to the center of rotation of the wheel. The pivot axis is inclined to provide a positive caster. The horizontal displacement shortens the spacing between the pivot axis and the rearward end of the wheel so that the wheel can be turned to a greater extent before it strikes against the body of the motor vehicle.

2 Claims, 2 Drawing Sheets

MOUNTING OF A STEERABLE WHEEL

BACKGROUND OF THE INVENTION

The invention relates to a mounting for a steerable wheel on an axle body.

In a known mounting arrangement, such as described in French Patent Specification No. 2,122,066 for mounting a drivable wheel of an agricultural tractor, the pivot axis of a hub housing of the wheel is displaced rearwardly of the axis of rotation of the wheel, as considered in the direction of forward travel of the agricultural tractor, and extends perpendicularly to the plane on which the agricultural tractor stands. Thus, the pivot axis is closer to the rearward end of the wheel than to the forward end thereof. This known mounting arrangement gives a greater steering angle than in conventional agricultural tractors because in a turn, the steering angle is normally limited by the rearward inner edge of the inner wheel striking against the body of the tractor. The disadvantages of this known mounting is that a high steering force is required because of the horizontal displacement between the pivot axis and the axis of rotation of the wheel.

SUMMARY OF THE INVENTION

An object of the present invention is to improve the mounting so that steering requires only lower levels of steering force.

In accordance with the invention, this problem is solved in that the pivot axis which passes through the mounting lugs is included to provide a positive caster. In this way, the pivot point of the wheel when steering is always either perpendicular below the axis of rotation of the wheel or displaced slightly forward relative thereto to reduce the steering forces. The positive caster also contributes to the wheels rolling in the stable and flutter-free manner. In the case of a driven wheel, with a suitable caster angle or with a variable drive speed which is dependent on the steering angle, the vehicle will be pulled into the turn. The mounting can be kept relatively small in regard to the dimensions thereof if the driveshaft is loaded with a low drive torque and is thus of small outside dimensions.

DETAILED DESCRIPTION

Figure 1:
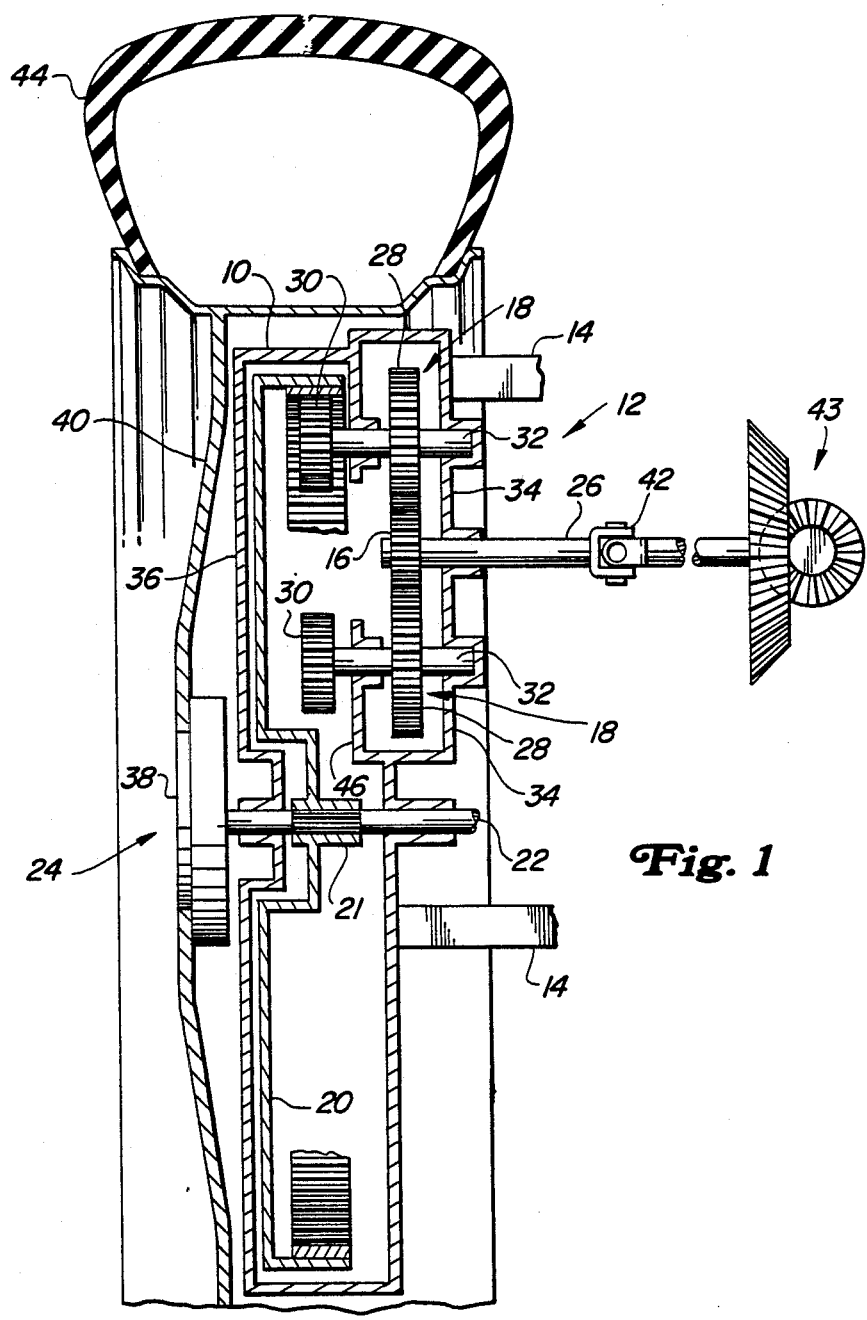
FIG. 1 is a diagrammatic side view of a transmission of a steerable wheel which is mounted in accordance with the invention.

Referring to the figures, shown therein is a housing 10 which accommodates a transmission 12 and which is connected by means of mounting lugs 14 to one end of an axle body (not shown), in particular of a front axle of an agricultural tractor. Provided in the mounting lugs 14 are mounting bores (not shown) which receive a king pin (not shown) which is carried at one end by the axle body, so that the housing 10 is pivotal about the king pin.

Disposed in the housing 10 are an input wheel 16, two two-stage intermediate wheels 18, an internal gear wheel 20 and a shaft 22 of a wheel hub 24. A driveshaft 26 also extends into the housing 10 at the upper portion thereof.

The input wheel 16 is non-rotatably mounted on an end of the driveshaft 26.

The intermediate wheels 18 includes a large diameter first stage 28 and a smaller diameter second stage 30. The gears of both stages 28 and 30 are non-rotatably connected together by a shaft 32.

The internal gear wheel 20 is in the general form of a bell, the central hub portion 21 of which is connected to the shaft of the wheel hub 24 in concentric relationship. It is advantageous for external splines to be provided on the shaft 22 and internal splines in the hub portion 21 of the gear wheel 20.

The shaft 22 extends through mutually oppositely disposed and approximately vertically extending walls 34 and 36 of the housing 10 and is mounted rotatably in the walls by means of taper roller bearings (not shown). The end portion of the shaft 22, which projects out to the left of the housing 10 in FIG. 1, carries a flange 38 of the wheel hub 24 to which a rim 40 is bolted. It will thus be seen that a rotating wheel hub 24 simultaneously rotates the rim 40 and a wheel 44 carrying same.

The drive shaft 26 extends from a differential through-drive means 43 by way of a universal joint 42 into the housing 10 and non-rotatably and coaxially carries the input wheel 16. The end portion of the driveshaft 26 which carries the input wheel 16 is preferably mounted floatingly in the housing 10 and thus permits load equalization as between the input wheel 16 and the intermediate wheels 18 or the first stage 28 thereof.

The intermediate wheels 18 are each carried by a respective shaft 32 which is mounted at one end in the wall 34 and centrally in a web portion 46 while the gear of the first stage 28 is located between the web portion 46 and the wall 34. The second stage gear 30, with the shaft 32, extends in cantilever relationship between the portion 46 and the wall 36.

The teeth on the input wheel 16 mesh with the teeth of the first stages 28 of the intermediate wheels 18. Depending on the magnitude and the direction of the force acting between the input wheel 16 and the first stage 28, the input wheel 16 will radially deflect slightly in order to provide a load equalization effect. The teeth on the smaller second stage 30 mesh with the inside teeth on the internal gear wheel 20. This results in a double step-down connection between input shaft 26 and gear wheel 20 and wheel 44. As the first and second stages 28 and 30 are non-rotatably connected together, a rotary movement which is introduced by way of the input wheel 16 is transmitted by the two intermediate gears 18 to the internal gear wheel 20 and from there to the wheel hub 24 and the wheel 44. It is however possible to provide only one intermediate wheel 18, as lying as provision is made for the force involved.

Figure 2:
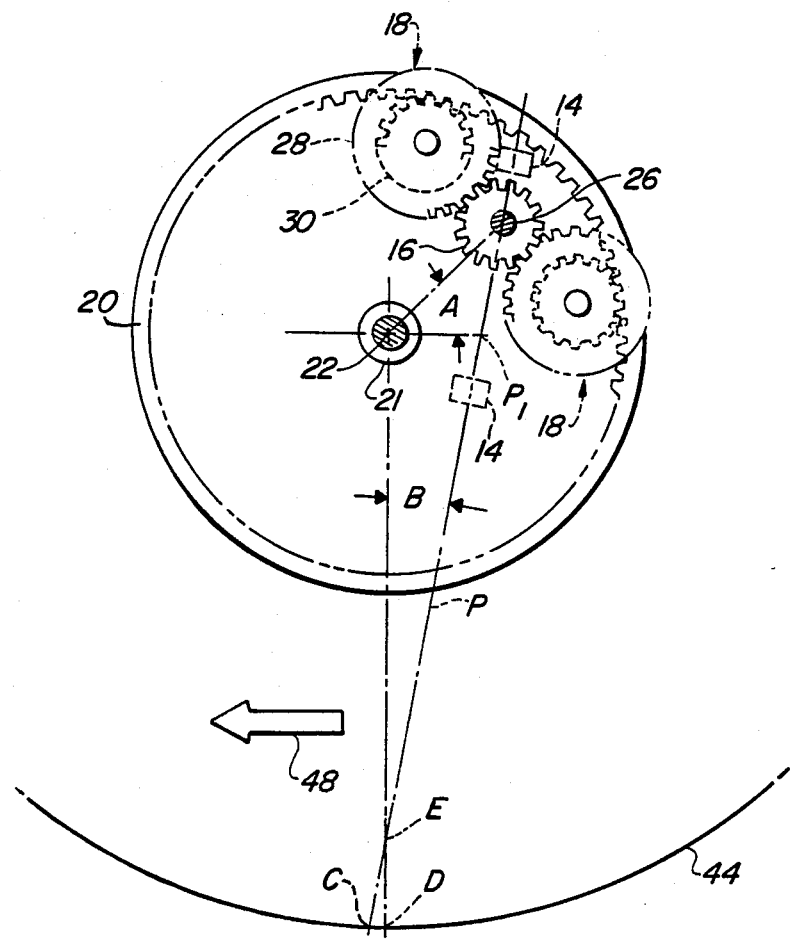
FIG. 2 is a front view, also in diagrammatic form, of the transmission and the arrangement of the mounting.

The actual arrangement of the input wheel 16 and the intermediate wheels 18 corresponds to that shown in FIG. 2, whereas in the case of FIG. 1, the wheels 16 and 18 are shown as being displaced, for the sake of clarity. It will also be seen from FIG. 2 that the input wheel 16 is disposed on a line which, starting from the center of rotation of the wheel 44, extends at an angle A of about 45 degrees relative to the horizontal. As also seen in FIG. 2, the axis of wheel 16 and wheels 18 lie on a line which is substantially perpendicular to the line extending from the center of wheel 20 through the center wheel 16. Arrow 48 shows the direction of forward travel of the wheel 44.

FIG. 2 also clearly shows that the pivot axis P which passes through the mounting lugs 14 is inclined by an angle B of between 10 and 15 degrees relative to the vertical. The axis P passes through a horizontal plane containing the axis of wheel 20 at a point P1 which is spaced horizontally rearwardly from the axis of wheel 20. By virture of its inclined positioning, that pivot axis P meets the plane on which the vehicle is standing at point C which is in front of the theoretical point of contact D of the wheel 44 with that plane (to the left of point D, viewing FIG. 2). Because the lugs 14 are connected to an axle body (not shown) the distance between points C and D remains constant despite changes in vehicle weight or forces due to braking. This gives the mouting a positive caster which provides for a stable tracking characteristic on the part of the wheel 44. It will be clearly seen that above point E, the distance between any part of the pivot axis P and the rearward end of the wheel 44 (which is not shown, but would be towards the right in FIG. 2) is shorter than the distance between the pivot axis P and the front end of the wheel 44 (which is not shown, but would be on the left in FIG. 2). This permits the wheel 44 to be further turned about the pivot axis beore it strikes against the body of the motor vehicle (not shown).

By virtue of the smaller number of components in the transmission 12 and the compact arrangement thereto, the housing 10 can be disposed within the rim 40.

While the invention has been described in conjunction with a specific embodiment, it is to be understood that many alternatives, modifications and variations will be apparent to those skilled in the art in light of the aforegoing description. Accordingly, this invention is intended to embrace all such alternatives, modifications and variations which fall within the spirit and scope of the appended claims.

We claim:

1. A mounting for a steerable wheel of an agricultural tractor, the mounting comprising:
    a housing rotatably supporting the wheel;
    lug means for pivotally connecting the housing to an axle body, the mounting lugs forming a pivot axis which intersects a horizontal plane containing an axis of wheel rotation at a point which is displaced horizontally rearwardly from the wheel rotation axis, the pivot axis being inclined with respect to a vertical axis and the pivot axis intersecting a plane upon which the wheel rests at a point which is spaced forwardly of the lowermost point of the wheel by a distance which remains constant despite changes in tractor weight or loading due to braking;
    a differential;
    an input wheel drivingly coupled to the wheel; and
    a drive shaft connecting the differential to the input wheel, the input wheel being non-rotatably fixed concentrically on an end of the drive shaft, and the drive shaft having an axis which is offset from the axis of the wheel.

2. The mounting of claim 1, wherein:
    a drive shaft extends into the housing; and
    the housing encloses a plurality of gears providing a double step-down connection between the drive shaft and the wheel.

* * * * *